Nov. 12, 1963  C. I. LUSINK ETAL  3,110,269
SIDE FRAME FOR CARTRIDGE BEARINGS
Filed May 29, 1961
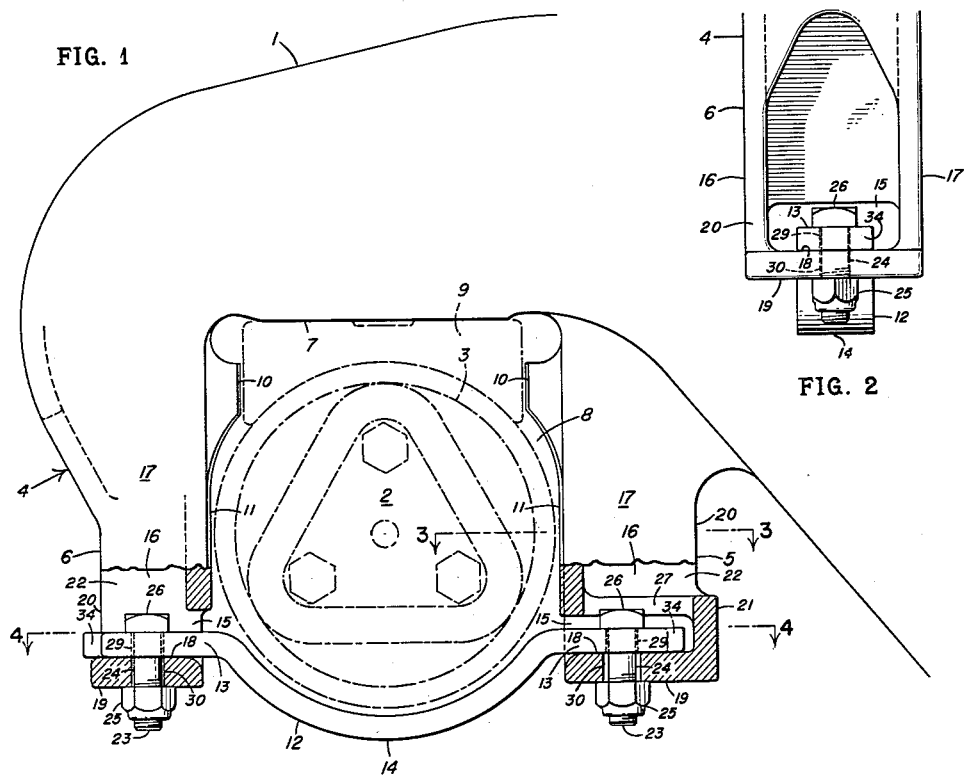
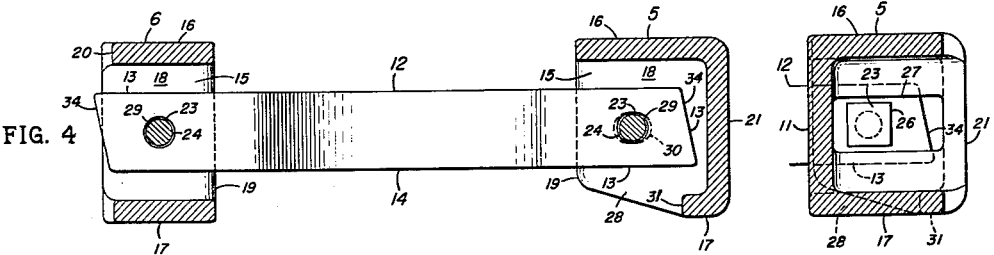
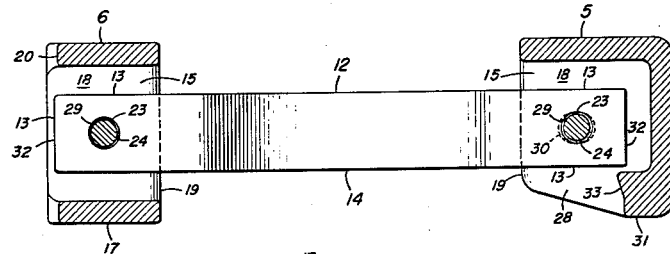
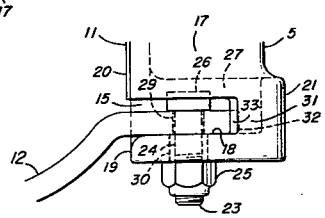
Inventors:
Clarence I. Lusink
Howard Winther
By Wilmer Mechlin
their Attorney 3,110,269
SIDE FRAME FOR CARTRIDGE BEARINGS
Clarence I. Lusink, Buffalo, and Howard Winther, Elma, N.Y., assignors to Symington Wayne Corporation, Salisbury, Md., a corporation of Maryland
Filed May 29, 1961, Ser. No. 113,292
9 Claims. (Cl. 105—221)

This invention relates to side frames for railway trucks and has for its primary object the provision of an improved pedestal type side frame having means for releasably retaining cartridge bearings in its jaws.

The increasing use of roller and other cartridge bearings in railway trucks has presented a problem in connecting them to a side frame. Although pedestal type side frames have long been used to mount separate journal boxes of the solid bearing type, the present problem is peculiar to cartridge bearings. In solid bearing journal boxes the limited relative movement, other than rotative, required in service between each journal and its bearing is accommodated within the journal box itself, so that the journal box can be made integral with or otherwise locked against movement relative to the side frame. However, no freedom of such relative movement exists within the casing of a cartridge bearing. It therefore is incumbent upon the connection between the cartridge and the side frame to provide the necessary movement. It is this that gives rise to the problem, particularly acute in the case of derailments, in preventing separation of the cartridges from the side frames and consequent falling apart of the trucks with corresponding increase in the damage to cars so equipped.

It is therefore an object of the present invention to provide an improved pedestal type side frame for cartridge bearings which is effective to rpevent its accidental separation from cartridge bearings mounted in it in case of derailment or otherwise.

Another object of the inventon is to provide a pedestal type side frame for cartridge bearings wherein the means for releasably retaining cartridge bearings in its jaws not only are effective in preventing accidental separation but are simple, inexpensive and easy to apply.

An additional object of the invention is to provide a pedestal type side frame for cartridge bearings whereby the side frame is simplified and strengthened by reducing the length of the jaws relative to those of a conventional side frame of the same type.

A further object of the invention is to provide a pedestal type side frame for cartridge bearings wherein the means for releasably retaining a cartridge bearing in a jaw normally is connected to both of the legs at the sides of the jaw and is proof against separation from the legs even though its connection to one of the legs fails.

Another object of the invention is to provide a pedestal type side frame for cartridge bearings wherein the retainer for releasably retaining a cartridge bearing in a jaw is applicable interchangeably not only to other jaws of the particular truck but to correspondingly wide or narrow jaws of side frames of different load capacities.

Other objects and advantages of the invention will appear hereinafter in the detailed description, be particularly pointed out in the appended claims and be illustrated in the accompanying drawings, in which:

FIGURE 1 is a fragmentary front elevational view of a preferred embodiment of the improved pedestal type side frame of the present invention, with portions broken away and shown in section to more clearly illustrate certain of the details of construction;

FIGURE 2 is a fragmentary end elevational view of the side frame of FIGURE 1;

FIGURE 3 is a fragmentary horizontal sectional view taken along lines 3—3 of FIGURE 1;

FIGURE 4 is a horizontal sectional view taken along lines 4—4 of FIGURE 1;

FIGURE 5 is a horizontal sectional view on the section of FIGURE 4 of another embodiment of the side frame of this invention; and FIGURE 6 is a fragmentary front elevational view of the side frame of FIGURE 5.

Referring now in detail to the drawings in which like reference characters designate like parts, the improved pedestal type side frame 1 of this invention is particularly designed for use with roller and other cartridge bearings. Indicated at 2, such a cartridge bearing differs from the conventional solid bearing journal box in having rollers or other anti-friction means of such type and so lubricated as to require inspection only at long intervals. Consequently, the casing or housing 3 of such a bearing ordinarily has its front opening (not shown) sealed closed to inhibit entry of moisture or other foreign matter.

A cartridge bearing also differs basically from a conventional journal box fitted with solid bearings in the substantial non-existence in the former of relative movement, other than rotative, between the cartridge and the axle journal received therein. As mentioned earlier, it is the non-existence of such relative movement and the consequent necessity of accommodating limited movement in the connection between the casing and the side frame that has led to difficulties.

Conventionally, the side frame 1 has counterpart integral pedestals 4 at its opposite ends, the showing of one of which, as in the illustrated embodiment, will suffice for an understanding of the invention. Also conventionally, each pedestal 4 is comprised of a pair of substantially vertically disposed, downstanding or depending, inner and outer legs 5 and 6, respectively, bounding with an included upper or top, horizontally disposed wall 7, a downwardly opening jaw 8 for receiving, accommodating or seating one of the cartridge journal bearings or bearing assemblies 2. When seated in the jaw or bearing opening 8, the cartridge bearing 2 usually will be held against transverse or lateral movement relative to the side frame 1 by a saddle or adapter 9 interposed between its generally cylindrical casing 3 and the top wall 7 of the jaw and surmounting and releasably locked to the casing, as by ribbing (not shown). In turn, the saddle 9 may be held in place by gibs (not shown) embracing the inboard and outboard sides of either the legs 5 and 6 or positioning lugs 10 integral with and instanding from the upper portions of the legs into the jaw 8.

While the interlock between the bearing 2 and the side frame 1 provided by the saddle 9 is effective to limit movement of the bearing transversely of the side frame and its movement longitudinally thereof is limited by the legs 5 and 6, the jaw 8 is open at the bottom and the legs, at least below the center of the bearing, have substantially straight and parallel inner or opening-confronting sides 11 in order to facilitate application and removal of the bearing. However, if accidental separation of the bearing and the side frame, particularly incident to a derailment, is to be prevented, it is essential that downward movement of the bearing be limited except when its application or removal is desired. In accordance with this invention, this is accomplished by a retainer in the form of a strap or bar 12 bridging, straddling or extending across the jaw 8 below the bearing 2 and conveniently made by stamping it from a flat strip of metal.

The retainer strap 12 is designed to have its opposite end portions 13 anchored or connected to the legs 5 and 6 so as to pull thereagainst when subjected through the bearing to downward forces, as well as to hold the relative vertical movement of the bearing substantially to the minimum required in service. Its end portions 13 preferably are flat and coplanar and between or intermediate those portions the strap has an intermediate portion 14 which extends substantially across the jaw 8 and is upwardly concave, as by downward bending, bowing or bulging, to conform substantially to the curvature of the underside of the casing 3. The preferred downward bending of the intermediate portion 14 of the strap not only affords an extended bearing area with the casing 3 of the bearing under downward forces tending to move the bearing out of the jaw 8 but, in cooperation or conjunction with the particular manner in which the end portions 13 are connected to the legs 5 and 6, enables the length or downward extent of both legs to be reduced, relative to those of a conventional truck, such that they terminate downwardly within the vertical limits or extremities and above the lower extremity of the bearing 2 with consequent saving of metal.

For connecting the strap 12 to each of the legs 5 and 6, the inner side 11 of each jaw is interrupted adjacent its lower extremity or end by a horizontally extending slot or aperture 15 opening between the inboard and outboard walls 16 and 17, respectively, of its jaw onto a horizontally disposed, upwardly facing seat 18 for one of the end portions 13, the seat in each leg preferably being the substantially flat, horizontal upper face of a bottom web 19 rigid or integral with and extending laterally or transversely between the inboard and outboard walls of that jaw. Although each of the slots 15 may extend through its leg 5 or 6 from the latter's inner side to its opposite or outer side 20, it is preferred to so extend only one of the slots and that the other be closed or bounded inwardly or rearwardly by a vertically disposed inner or rear wall or web 21 upstanding or extending upwardly from the bottom web 19 of its leg 5 or 6. However, both of the slots 15 open upwardly within their respective legs and are accessible from above through a core print or other suitable aperture 22 opening onto one, preferably the outer, side 20 of the related leg. With the slots so accessible, suitable means, such as the illustrated bolts 23, can readily be inserted thereinto for releasably anchoring, connecting or fastening the end portions 13 of the strap in their seats. If, as in the illustrated embodiment, the strap 12 is bolted to the legs, each end portion 13 and the bottom web 19 on which it seats will be appropriately apertured to enable the shank 24 of the connecting bolt 23 to extend vertically therethrough and carry below the web a nut 25. For the inner leg 5 in which the working space at the side is limited, it also is preferred that the head 26 of the bolt be square or otherwise out-of-round so as to slide but be locked against rotation in a guide slot 27 forming part of the top opening or aperture 22 into the slot 15 of that leg.

The preferred retainer strap 12 not only closes the jaw 8 below the bearing 2 but the clearance or spacing between its intermediate portion 14 and the casing 3 of the bearing is so limited as to prevent vertical movement of the casing sufficiently to release it from the saddle 9. When in place, the strap thus is effective to prevent accidental separation of the bearing 2 and side frame 1, while permitting the limited relative movement therebetween necessitated by the substantial lack of movement, other than rotative, between the bearing and the journal. However, with the clearance between the strap and the casing so slight, a problem is posed in applying the strap to the pedestal 4. This problem is here solved by extending one of the slots 15, here that in the outer leg 6, through that leg and providing in the other, here inner, leg 5, for which the inner wall 21 of its slot affords suitable reinforcement for the purpose, an access or front opening 28 through its outboard wall 17 into its slot. This construction enables the strap to be applied by first inserting or sliding one of its end portions 13 endwise into the open-ended slot 15 in the outer leg 6 beyond normal position to the point at which the part of the intermediate portion 14 removed therefrom is in contact with the confronting part of the casing 3, and then swinging the other end portion sideways through the front opening 28 into the closed-ended slot in the inner leg 5. With the end portions in their respective slots 15, it simply is a matter of longitudinally sliding or shifting the strap slightly in the direction of the inner leg 5 to align the bolt apertures or holes 29 and 30, respectively, in the strap and the bottom webs 19 of the legs and enable the bolts to be applied, this preferably being facilitated by elongating the aperture in one or the other of the bottom webs, here that of the inner leg 5, to compensate for casting tolerances.

While each of its straps 12 normally will be anchored to both legs 5 and 6 of the related jaw, the side frame 1 is designed to prevent separation or dislodgment of the strap from either leg, even should one of the connecting bolts or other anchoring means 23 be lost or broken or otherwise fail. This, in the case of the closed-sided slot 15 in the outer leg 6, poses no problem since, on loss or failure of the bolt 23 at that end of the strap 12, the uninterrupted inboard and outboard walls 16 and 17 bounding the sides of the slot will effectively prevent dislodgment of the strap so long as the latter is anchored at its opposite end. On the other hand, the access opening 28 in the outboard wall 17 of the other leg could enable the strap to slide therethrough and lose its effectiveness as a retaining means, should the adjoining bolt be lost or otherwise fail as a connection. Consequently, the outer end of the access opening 28 is bounded by a lip or flange 31 which longitudinally overlaps the adjoining end portion 13 of the strap when the latter is in normal position, as well as when, due to breakage or loss of the bolt or other connecting means at that end, the strap is free to swing about the bolt at the other end.

If, as in the form shown in FIGURES 5 and 6, the strap has square ends 32, a bevelling of the lip 31, as at 33, is required to enable that end of the strap to be swung past the lip on initial application and still be overlapped longitudinally by the lip within the range of permissive movement of the strap after its opposite end portion has been bolted to the outer leg. Alternatively, as in the form of FIGURE 4, the strap may have oppositely biased or oblique ends 34 such that the end portion in the closed-ended slot, pocket or cavity 15 will taper toward its front edge and consequently the lip. In such case, the biased end may readily be inserted into the open-fronted slot or pocket 15 past the lip 31 without bevelling of the latter. However, the bias-ended form of FIGURE 4, while having this advantage over the square-ended form of FIGURE 5, is limited in application to the diagonally opposite jaws of the railway truck (not shown) of which the side frame 1 is a part, by contrast with the square-ended form, which is applicable interchangeably to both jaws of the side frame and all of those of the truck. Although a strap of a length to fit a wide jaw ordinarily will not fit a narrow jaw and vice versa, the jaws of each type of side frames for the more common 50 and 70 ton trucks are of substantially the same width. Thus, depending on whether its length is suited for a narrow or wide jaw, the same strap of either form can be applied to side frames of different load capacity having jaws of like width.

From the above detailed description, it will be apparent that there has been provided an improved pedestal type side frame for cartridge bearings which, while permitting limited movement between the bearing and the side frame, effectively prevents their accidental separation. It should be understood that the described and disclosed embodiment is merely exemplary of the invention and that all modifications are intended to be included which do not depart from either the spirit of the invention or the scope of the appended claims.

Having described my invention, I claim:

1. In a pedestal type side frame having a downwardly opening jaw bounded laterally by downstanding legs for receiving a cartridge bearing, the combination of an upwardly facing seat in each of said legs above a lower extremity of a bearing in said jaw, a slot in each leg and opening from the seat therein onto said jaw, a retainer strap extending across said jaw below and having an upwardly concave intermediate portion substantially conforming in contour to and disposed adjacent an underside of said bearing, said strap having end portions extending into said slots and supported on said seats, and releasable means in each of said slots for individually securing each said end portion to its seat.

2. In a pedestal type side frame having a downwardly opening jaw bounded laterally by downstanding legs for receiving a cartridge bearing, the combination of an upwardly facing seat in each of said legs above a lower extremity of a bearing in said jaw, a slot in each leg and opening from the seat therein onto said jaw, a retainer strap extending across said jaw below and having an upwardly concave intermediate portion substantially conforming in contour to and normally disposed adjacent and spaced from an underside of said bearing, said strap having end portions extending into said slots and supported on said seats, and releasable means in each of said slots for individually securing each said end portion to its seat.

3. In a pedestal type side frame having a downwardly opening jaw bounded laterally by downstanding legs for receiving a cartridge bearing, the combination of an upwardly facing seat in each of said legs, strap means extending across said opening below a bearing therein and having end portions seated on said seats, means releasably connecting each of said end portions to the leg in which it is seated, and means on each leg and operative on failure of said connecting means thereon for preventing accidental separation of said strap means from said legs under forces exerted between said strap means and bearing.

4. In a pedestal type side frame having a downwardly opening jaw bounded laterally by downstanding legs for receiving a cartridge bearing, the combination of seat means fixed to each of said legs, strap means extending across said opening below a bearing therein and having end portions seated on said seats, means releasably connecting each of said end portions to the leg in which it is seated, and means on each leg and operative on failure of said connecting means thereon for preventing accidental separation of said strap means from said legs under forces exerted between strap means and bearing.

5. In a pedestal type side fame having a downwardly opening jaw bounded laterally by downstanding legs for receiving a cartridge bearing, the combination of seat means fixed to each of said legs, a slot opening from said jaw into each of said legs between inboard and outboard walls thereof, an upwardly facing seat in each slot, a strap extending across said jaw below a bearing therein and having end portions extending into said slots and seated on said seates, said strap being insertible endwise into one of said slots and sideways into the other slot through an opening in an outboard wall thereof, means releasably connecting each end portion to the leg in which it is seated, and means on one of said legs bounding an end of said opening and longitudinally overlapping the end portion inserted therethrough, said bounding means cooperating with the means connecting the opposite end portion to the other leg for preventing accidental separation of said strap from said legs on disconnection of the adjoining end portion from its leg.

6. In a pedestal type side frame having a downwardly opening jaw bounded laterally by downstanding legs for receiving a cartridge bearing, the combination of seat means fixed to each of said legs, a slot opening from said jaw into each of said legs between inboard and outboard walls thereof, an upwardly facing seat in each slot, a strap extending across said jaw below and having an upwardly concave intemediate portion facing and normally spaced from a bearing therein, said strap having identical end portions each projecting into one of said slots and seated in the seat therein, said strap being insertible endwise into one of said slots and sideways into the other slot through an opening in an outboard wall thereof, means releasably connecting each end portion to the leg in which it is seated, and means on one of said legs bounding an end of said opening and longitudinally overlapping the end portion inserted therethrough, said bounding means cooperating with the means connecting the opposite end portion to the other leg for preventing accidental separation of said strap from said legs on disconnection of the adjoining end portion from its leg.

7. In a pedestal type side frame having a downwardly opening jaw bounded laterally by downstanding legs for receiving a cartridge bearing, the combination of seat means fixed to each of said legs, a slot opening from said jaw into each of said legs between inboard and outboard walls thereof, an upwardly facing seat in each slot, a strap extending across said jaw below and having an upwardly concave intermediate portion facing and normally spaced from a bearing therein, said strap having counterpart end portions each projecting into one of said slots and seated in the seat therein, said strap being insertible endwise into one of said slots and sideways into the other slot through an opening in an outboard wall thereof, means releasably connecting each end portion to the leg in which it is seated, and means on one of said legs bounding an end of said opening and longitudinally overlapping the end portion inserted therethrough, said bounding means cooperating with the means connecting the opposite end portion to the other leg for preventing accidental separation of said strap from said legs on disconnection of the adjoining end portion from its leg.

8. In a pedestal type side frame having a downwardly opening jaw bounded laterally by downstanding legs for receiving a cartridge bearing, the combination of seat means fixed to each of said legs, a slot opening from said jaw into each of said legs between inboard and outboard walls thereof, an upwardly facing seat in each slot, a strap extending across said jaw below and having an upwardly concave intermediate portion facing and normally spaced from a bearing therein, said strap having identical square-ended end portions each projecting onto one of said slots and seated in the seat therein, said strap being insertible endwise into one of said slots and sideways into the other slot through an opening in an outboard wall thereof, means releasably connecting each end portion to the leg in which it is seated, and a lip fixed to one of said legs at an end of said opening and longitudinally overlapping the end portion inserted therethrough, said lip cooperating with the means connecting the opposite end portion to the other leg for preventing accidental separation of said strap from said legs on disconnection of the adjoining end portion from its leg.

9. In a pedestal type side frame having a downwardly opening jaw bounded laterally by downstanding legs for receiving a cartridge bearing, the combination of seat means fixed to each of said legs, a slot opening from said jaw into each of said legs between inboard and outboard walls thereof, an upwardly facing seat in each slot, a strap extending across said jaw below and having an upwardly concave intermediate portion facing and normally spaced from a bearing therein, said strap having counterpart bias-ended end portions each projecting into one of said slots and seated in the seat therein, said strap being insertible endwise into one of said slots and sideways into the other slot through an opening in an outboard wall thereof, means releasably connecting each end portion to the leg in which it is seated, and a lip fixed to one of said legs at an end of said opening and longitudinally overlapping the end portion inserted therethrough, said lip cooperating with the means connecting the opposite end portion to the other leg for preventing accidental separation of said strap from said legs on disconnection of the adjoining end portion from its leg.

References Cited in the file of this patent

UNITED STATES PATENTS

| | | |
|---|---|---|
| 1,748,035 | Clasen | Feb. 18, 1930 |
| 2,424,327 | Nystrom et al. | July 22, 1947 |
| 2,758,551 | Kreiner | Aug. 14, 1956 |

FOREIGN PATENTS

| | | |
|---|---|---|
| 923,198 | Germany | Feb. 7, 1955 |